United States Patent Office 2,828,453
Patented Mar. 25, 1958

2,828,453
SELENIUM RECTIFIERS

Eric Lionel French, London, England, assignor to Westinghouse Brake and Signal Company, Limited, London, England No Drawing. Application June 7, 1956
Serial No. 589,878

Claims priority, application Great Britain June 15, 1955

8 Claims. (Cl. 317—241)

My invention relates to selenium rectifiers of the kind in which an artificial or non-genetic barrier layer is provided between the selenium and counter-electrode layers.

According to the invention, in a rectifier of the kind described the non-genetic layer includes or consists of solid ethoxyline resin.

The term "ethoxyline resin" means, in this specification, an aliphatic aromatic polyether with terminal epoxy groups and pendant hydroxyl groups such, for example, as that produced by the alkaline condensation of epichlorhydrin and 2,2'-bis (4-hydroxy phenyl) propane. The term "solid ethoxyline resin" means a resin of this kind which is solid at 80° C. and is to be understood as including an ethoxyline resin having pendant hydroxyl groups which is produced from an ethoxyline resin of lower molecular weight by curing: it is, further, to be understood that the ethoxyline resin of lower molecular weight may be liquid at 80° C.

The effect of introducing the ethoxyline resin is to increase the reverse resistance of the rectifier. When the non-genetic layer includes a material other than the solid ethoxyline resin that other material may be a diluent, such as polyvinyl chloride, which has the effect of diminishing progressively as its proportion is increased the effect of the ethoxyline resin upon the reverse resistance of the rectifier. Alternatively, that other material may be D-glucose, which, when present as a discrete layer adjacent to the ethoxyline resin has the effect of enhancing the influence of the ethoxyline resin upon the reverse resistance of the rectifier.

Alternatively that other material may be a curing agent for the ethoxyline resin, an excess of which may be present as a discrete layer adjacent to the ethoxyline resin after curing is complete. Suitable curing agents are low molecular weight linear polyamides containing reactive amine groups such as are prepared by reacting a polyfunctional aliphatic amine and a dimeric fatty acid, for example, that sold under the trade name "Beckalide 10." Alternatively the curing agent may be a monofunctional amine which reacts with the terminal epoxy groups of the ethoxyline resin to produce an amine alcohol such, for example, as piperidine. Alternatively also, the curing agent may be a polyfunctional amine which reacts with the terminal epoxy groups of the ethoxyline resin to produce a cross-linked structure such, for example, as triethylene tetramine. Alternatively, also, that other material may be a linear polyhydroxy compound which is solid at room temperature and which reacts by etherification of the terminal epoxy groups of the ethoxyline resin, such as an acyclic linear polyhydric alcohol of which sorbitol is one example.

According to one method of putting the invention into effect an incomplete rectifier element consisting of a base plate having a layer of selenium applied to it, the selenium being in its crystalline form, is immersed for one minute in a 6% solution by weight of ethoxyline resin of the kind sold under the trade name "Epikote 1009" dissolved in a xylene-benzyl alcohol solvent mixture, the plate being arranged with its plane vertical and being withdrawn vertically at a rate of six inches per minute. The temperature at which this dipping is performed is so chosen that the solvent mixture evaporates almost completely and the plate is dry in appearance within a few seconds of its being withdrawn from the solution. As, however, benzyl alcohol has a deleterious effect upon the degree of electroforming which may be achieved, its complete removal is desirable. To this end, the plate is preferably exposed to radiant heat for a few minutes immediately after its withdrawal from the solution. The counter-electrode is then applied and the element is electroformed in known manner.

Alternatively, the ethoxyline resin sold under the trade name "Epikote 1007" may be used instead of the "Epikote 1009" referred to above.

Other solvents may be used in place of the benzyl alcohol referred to above, for instance, methyl ethyl ketone, methyl cyclohexanone, diacetone alcohol, ethylene glycol monoethyl ether acetate, ethylene glycol monoethylether, ethylene glycol mono-n-butyl ether and, as with the benzyl alcohol solvent, they may be diluted with an aromatic hydrocarbon such as xylene, the proportion of aromatic hydrocarbon being adjusted to give a rate of evaporation such that the plate is dry in appearance within a few seconds of its being withdrawn from the solution. Exposure of the plate to radiant heat after its withdrawal from the solution is desirable also when these other solvents are used. To some degree the reverse resistance of the rectifier is dependent upon the particular solvent used, the higher alcohols, for instance benzyl alcohol, giving particularly good results.

The rate of evaporation also depends upon ambient temperature and rate of air flow past the plate. The procedure set out above has been found suitable for a xylene-benzyl alcohol solvent mixture containing 75 parts by weight of xylene and 25% parts by weight of benzyl alcohol, used in a room which is at a temperature of 25° C. and which has a normal degree of ventilation, the resulting rectifier having a non-genetic layer of such a thickness that the forward resistance of the rectifier is of a reasonable value. Variation of any of the conditions results in a change in this forward resistance, but in practice, it has been found convenient, when a change in the forward resistance is desired, to change the concentration of the solution and to maintain all other conditions constant. In practice, the concentration of the solution may, for a 75/25 xylene-benzyl alcohol mixture, be conveniently varied between 1 and 10 percent. With a 1 percent solution the effect of the process upon the reverse resistance of the rectifier becomes seriously impaired, probably because the layer becomes too thin, and at a proportion of 10 percent the effect of increasing this proportion becomes insignificant. The effects of variation of these other conditions are complex, but are similar to those well known in the art of forming paint films.

The stability of the completed rectifier is dependent upon the curing agent used and increases with increasing molecular weight of the ethoxylene resin present in the non-genetic layer of the completed rectifier. It is, therefore, advantageous to increase the molecular weight of the resin as far as possible by curing but the process must be performed with care because the production of resin of very high molecular weight limits the degree of electroforming which is attainable and the completion of curing prevents electro-forming completely. The reverse resistance of a rectifier the non-genetic layer of which has been cured may be markedly higher than that of a rectifier the non-genetic layer of which has not been cured and this increase is particularly large when triethylene tetramine is used as a curing agent.

The curing agents used must be substances of the kind set out above which react mainly with the terminal ethoxyline groups.

If polyamide resins are used the use of ester solvents should be avoided as they tend to react with the curing agent and prevent curing.

Preferably the curing agent is added to the dipping solution described above. If amines are used the proportion of curing agent may be as high as one part by weight of amine to ten parts of weight of ethoxyline resin and if polyamide resins are used the proportion may be as high as equal parts by weight. The maximum proportions suggested will ensure that the curing agent and ethoxyline resin are present in at least stoichiometric proportions in the non-genetic layer. These proportions are not, however critical and will be dependent upon the ethoxyline resin and curing agent used. Using "Epikote 1009" and "Beckalide 10" the preferred proportion is 13 parts by weight of "Beckalide 10" to 100 parts by weight of "Epikote 1009."

Although curing proceeds continuously from the time the curing agent is added, a large number of satisfactory rectifiers may be made one after the other using the same solution, the properties of the rectifiers varying continuously, depending upon the degree of cure existing at the time of dipping. If the curing is allowed to proceed too far, however, electroforming is reduced and eventually prevented. Further, with certain solvents, the ethoxyline resin becomes insoluble during curing and is consequently, precipitated from the solution. It is preferable, therefore, to stabilize the solution before dipping is commenced. This may be done by adding a smaller quantity of curing agent than that suggested above, preferably half, and heating the solution until all the curing agent has become combined with the resin. If the curing agent used is volatile the precaution must be taken of refluxing during this heating.

An alternative method of applying curing agent is to dip a plate to which the ethoxyline resin has been applied in a solution of the curing agent. The solvent for the curing agent must be one which does not dissolve the ethoxyline resin to any serious degree; for example, a suitable solvent for "Beckalide 10" is isopropyl alcohol but if used alone it would dissolve the ethoxyline resin completely. By diluting isopropyl alcohol with acetone, however, the dipping may be performed at a temperature which is low enough to prevent serious attack upon "Epikote 1009" by the isopropyl alcohol but which is high enough to ensure the substantially complete evaporation of the solvent mixture within a short time of the plate being withdrawn from the solution.

The period during which the plate is immersed in the solution of the curing agent and the time occupied by the solvent in evaporating must be kept short in order to prevent the curing agent penetrating to the selenium in significant quantities and thereby causing an unduly high forward resistance. Using "Beckalide 10" dissolved in isopropyl alcohol-acetone solvent mixture it has been found preferable to use a solution containing 2% by weight of curing agent, the solution being maintained at 70° C., the plate being immersed for one minute and being withdrawn vertically at a rate of six inches per minute. With other solvents it may be preferable to vary these conditions within the limits imposed by the need to limit the severity of the attack by the curing agent upon the selenium.

As a further precaution and in order to ensure that all solvent is removed from the plate it is preferable to heat the plate for five minute at 80° C. immediately after its removal from the solution of curing agent. This has the additional effect of partially curing the ethoxyline resin but it does not effect a complete cure and so does not materially reduce the degree of electroforming which may be attained.

Alternatively, the curing agent may be applied by a separate dipping process after, instead of before, the counterelectrode has been applied.

Curing agents having a lower reactivity than "Beckalide 10" may, alternatively, be applied as a separate dip before the ethoxyline resin is applied. In order, however, to reduce the attack upon the selenium and, consequently, to reduce forward aging the time of immersion should be reduced to a few seconds and the succeeding steps completed as rapidly as possible until the stage is reached when the rectifier is completely cured. Although a rectifier made by this process is useful it is not possible to avoid a substantial degree of forward aging.

If a curing agent is used it is possible to make satisfactory rectifiers using as starting materials ethoxyline resins which are liquid at 80° C. such, for example, as that sold under the trade name "Epikote 1001." The curing so increases the melting point that good electroforming is possible and the non-genetic layer is solid at 80° C. after completion of the curing.

The process of electroforming causes heating of the non-genetic layer and, if a curing agent is present in the layer and the layer is, as it should be at the commencement of the process of electroforming, incompletely cured, this heating will cause curing to continue at a rapid rate. This curing is preferably permitted to continue until all the curing agent has been reacted with the ethoxyline resin and if electroforming alone does not achieve this result the plate is preferably heated after electroforming until the curing is complete. In order to ensure that this may be done the ethoxyline resin must be present in excess, but where there is an excess of curing agent, as there may be if the curing agent has been applied as a separate layer, such excess curing agent will remain after curing has been completed.

If an amine is used as the curing agent it acts, by virtue of its alkaline nature, as a forming agent, increasing the degree of electroforming attainable. This treatment with an alkaline substance results, as is well known, in an initial increase in the forward resistance of the rectifier and a further, continuous, increase during life. Such increase in forward resistance during life may be limited to negligible proportions by curing, whereby the amine is caused to be completely reacted with the resin.

Again, if an amine is used as the curing agent, the volatility may be such that it can be applied to the resin in the form of a vapor. The process may be performed by immersing the plate in a beaker containing a small quantity of the amine, the latter being sufficiently volatile at normal room temperature to produce in the vessel a sufficient concentration of vapor. The process may be performed either before or after the counterelectrode has been applied. If the counterelectrode has already been applied the plate is preferably subjected to an electroforming process immediately it is exposed to the amine vapor. The heat generated during forming increases the vaporization of the amine and at the same time cures the ethoxyline resin.

During the application of the ethoxyline resin the base plate necessarily becomes covered but the covering is so thin that its resistance is small and so does not give the rectifier an unreasonably high forward resistance.

Another method of putting the invention into effect is to provide a non-genetic layer consisting of a discrete layer of solid ethoxyline resin and a discrete layer of D-glucose, the layers being in contact with each other. This arrangement gives the surprising result that the degree of electroforming is substantially greater than that attainable with a non-genetic layer consisting of ethoxyline resin alone. Preferably the ethoxyline resin layer is contiguous with the selenium layer but the positions of the layers within the non-genetic layer may, alternatively, be reversed.

In putting this method into effect an incomplete rectifier element consisting of a base plate having a layer of selenium applied to it, the selenium being in its crystalline form, is immersed for one minute in a one percent solution by weight of the monosaccharide D-glucose in water, the solution being maintained at 80° C. In order to ensure uniformity of the non-genetic layer there is added to the solution a material which wets the selenium, for example, gelatine. The plate is then removed from the solution, being arranged with its plane vertical and being withdrawn vertically at a rate of six inches per minute. The temperature at which this dipping is performed and the rate of withdrawal are so chosen that the water evaporates almost completely and the place is dry in appearance within a few seconds of its being withdrawn from the solution. The proportion of D-glucose may be varied within limits: with a proportion of 0.5 percent on the effect of the process upon the rectifier becomes seriously impaired, probably because the layer becomes too thin, and at a proportion of 4 percent the effect of increasing the proportion becomes insignificant. The proportion of wetting agent is preferably as small as possible compatible with the deposition of a uniform film. Gelatine is preferably added in the proportion of 0.02 percent by weight of the solution and it has the unexpected effect of producing a higher reverse resistance than is obtained when using such wetting agents as that sold under the trade name "Toepol."

In order to ensure complete evaporation of the water the plate is preferably exposed to radiant heat for a few minutes after its withdrawal from the solution.

The rate of evaporation depends, as it does when the ethoxyline resin is applied, upon the ambient temperature and the rate of air flow past the plate whilst it is being withdrawn from the solution. The procedure set out above has been found suitable for use in a room at a temperature of 15° C. and having a normal degree of ventilation, the resulting rectifier having a non-genetic layer of such a thickness that the forward resistance of the rectifier is of reasonable value. Variation in any of the conditions results in a change in this forward resistance but, in practice, it has been found convenient to vary the thickness of the layer by variation in the concentration of the solution, all other conditions being maintained constant.

After the plate has dried completely the counterelectrode is applied and the element electroformed in known manner.

During the application of the D-glucose the base plate necessarily becomes covered with a film of this material, in addition to the film of ethoxyline resin which has already been applied but the film is so thin that its resistance is small and the forward resistance is not increased unduly.

If the glucose layer is deposited upon the ethoxyline resin the adhesion between the glucose and the counterelectrode is poor but may be improved by heating at 110° C. to 125° C. for one to four hours after completion of the electroforming.

In yet another method of putting the invention into effect the glucose may be replaced by a linear polyhydroxy compound which is solid at room temperature and which reacts by etherification of the terminal epoxy groups of the ethoxyline resin. Acyclic linear polyhedric alcohols are compounds of this kind and one example of such an alcohol is sorbitol.

Sorbitol may be applied in the same manner and under the same conditions as are described above in relation to the application of D-glucose. The resulting rectifier has a reverse resistance higher than that of a rectifier which is similar apart from the fact that the non-genetic layer consists of ethoxyline resin alone.

Preferably the ethoxyline resin is applied in the manner first described above and a layer of sorbitol is applied over the ethoxyline resin. The rectifier is preferably heated after electroforming in order to improve adhesion between the non-genetic layer and the counterelectrode, the conditions under which the rectifier is heated being the same as those for a rectifier having a glucose layer adjacent to the counterelectrode.

Alternatively another polyhedric alcohol may be used in place of sorbitol and as a further alternative a mixture of polyhedric alcohols may be used. When such a mixture is used the total proportion of polyhedric alcohol present in the solution is preferably the same as that present when only one such alcohol is used.

Although I have herein described several methods of forming a non-genetic or artificial barrier layer on the selenium layer of a rectifier cell, it is to be understood that various changes and modifications may be made therein within the scope of the appended claims without departing from the spirit and scope of my invention.

Having thus described my invention, what I claim is:

1. A selenium cell having a non-genetic barrier layer of ethoxylene resin on the selenium layer.

2. A selenium cell according to claim 1 in which the resin is one produced by the alkaline condensation of epichlorhydrin and 2,2'-bis (4-hydroxy-phenyl) propane.

3. A selenium cell comprising, a base plate, a selenium layer on said base plate, a non-genetic barrier layer on said selenium layer consisting of a layer of ethoxylene resin and a layer of a monosaccharide, and a counterelectrode layer on said non-genetic barrier layer.

4. A selenium cell comprising, a base plate, a selenium layer on said base plate, a non-genetic barrier layer on said selenium layer consisting of a layer of an ethoxylene resin and a layer of a monosaccharide, and a counterelectrode layer on said non-genetic barrier layer, said monosaccharide layer being adjacent the counterelectrode layer.

5. A selenium cell comprising a base plate, a selenium layer on said base plate, a non-genetic barrier layer of ethoxylene resin and a linear polyhydroxy compound, and a counterelectrode layer on said non-genetic barrier layer.

6. A selenium cell comprising a base plate, a selenium layer on said base plate, a non-genetic barrier layer of ethoxylene resin and acyclic linear polyhedric alcohol, and a counterelectrode layer on said non-genetic barrier layer.

7. A selenium cell comprising a base plate, a selenium layer on said base plate, a non-genetic barrier layer of ethoxylene resin and sorbitol, and a counterelectrode layer on said non-genetic barrier layer.

8. A selenium cell comprising a base plate, a selenium layer on said base plate, a non-genetic barrier layer of ethoxylene resin and one or more polyhedric alcohols, and a counterelectrode layer on said non-genetic barrier layer.

References Cited in the file of this patent

UNITED STATES PATENTS

| | | |
|---|---|---|
| 2,121,603 | Lotz | June 21, 1939 |
| 2,193,598 | Lotz | Mar. 12, 1940 |
| 2,386,750 | Saslaw | Oct. 16, 1945 |
| 2,481,739 | Goodman | Sept. 13, 1949 |
| 2,660,697 | Lauckner | Nov. 24, 1953 |
| 2,660,698 | Black | Nov. 24, 1953 |
| 2,783,419 | Fry | Feb. 26, 1957 |
| 2,794,943 | Eannarino | June 4, 1957 |
| 2,802,973 | French | Aug. 13, 1957 |
| 2,802,974 | French | Aug. 13, 1957 |